(12) United States Patent
Kostkin

(10) Patent No.: US 12,550,822 B2
(45) Date of Patent: Feb. 17, 2026

(54) VEHICLE PLATFORM ROTARY SUPPORT

(71) Applicant: PEK AUTOMOTIVE D.O.O, Vrhnika (SI)

(72) Inventor: Mikhail Kostkin, Vrhnika (SI)

(73) Assignee: PEK AUTOMOTIVE D.O.O., Logatec (SI)

( * ) Notice: Subject to any disclaimer, the term of this patent is extended or adjusted under 35 U.S.C. 154(b) by 558 days.

(21) Appl. No.: 17/927,872

(22) PCT Filed: Jun. 4, 2020

(86) PCT No.: PCT/IB2020/000390
§ 371 (c)(1),
(2) Date: Nov. 26, 2022

(87) PCT Pub. No.: WO2021/245434
PCT Pub. Date: Dec. 9, 2021

(65) Prior Publication Data
US 2023/0200301 A1    Jun. 29, 2023

(51) Int. Cl.
*A01D 46/20* (2006.01)

(52) U.S. Cl.
CPC ................... *A01D 46/20* (2013.01)

(58) Field of Classification Search
CPC ....................................... A01D 46/20
USPC ............................. 182/148; 108/7
See application file for complete search history.

(56) References Cited

U.S. PATENT DOCUMENTS 6,663,498 B2 * 12/2003 Stipan ................ A63B 69/3652
403/53
9,927,312 B1 * 3/2018 Berme ................ A63B 22/025
12,005,538 B2 * 6/2024 Prendergast ............. B23Q 1/26

FOREIGN PATENT DOCUMENTS

| CN | 109794954 A | 5/2019 |
|---|---|---|
| CN | 210119164 U | 2/2020 |
| CN | 110946005 A | 4/2020 |
| KR | 20170068854 A | 6/2017 |

(Continued)

OTHER PUBLICATIONS

International Search Report issued by ISA/EPO and mailed on Feb. 18, 2021.

*Primary Examiner* — Daniel J Troy
(74) *Attorney, Agent, or Firm* — Patentbar International

(57) ABSTRACT

The invention relates to the design of mobile platforms for vehicles used mostly for agricultural purposes. The rotary support includes a platform mounting attachment in the form of a gimbal, whose flanges enable its attachment, respectively, to the vehicle support structure and the lower surface of the platform, and two platform position adjusters located on said support structure. Therein, each platform position adjuster includes an electric drive with a linear displacement unit based on screw-nut transmission and a carriage configured to move along a vertical guide and connected to the linear displacement unit with a pin joint. The support shelf of the carriage bears a push rod made in the form of struts ending with supports and having swivel joints between said supports and struts. Therein, the push rod supports are configured for mounting them on the support shelf of the carriage and on the platform, in this latter case eccentrically to the rotation axes of the gimbal. Thus, the reliability of the structure and the speed of platform stabilization in space are improved.

4 Claims, 7 Drawing Sheets

(56) References Cited

FOREIGN PATENT DOCUMENTS

KR 101911931 B1 10/2018

\* cited by examiner

VEHICLE PLATFORM ROTARY SUPPORT

RELATED APPLICATIONS

This application is a U.S. National Stage Application of International Patent Application PCT/IB2020/000390 filed on Jun. 4, 2020 which is incorporated herein by reference in its entirety.

FIELD OF THE INVENTION

This invention relates to the design of mobile platforms on vehicles, mostly for agricultural purposes, enabling said platforms maintain a desired position in the process of vehicle operation.

BACKGROUND OF THE INVENTION

Various vehicles equipped with moving platforms are known, wherein the moving platform is set to a required position by rotary devices.

Patent KR 20170068854, publication date 2017 Aug. 30, describes the design of a vehicle working platform for dealing with tall objects. The vehicle has a base with two frames attached to it. One frame can be tilted along its longitudinal axis by means of a hydraulic cylinder, while the other frame can be tilted along its transverse axis using another hydraulic cylinder.

Patent CN 110946005, publication date 2020 Apr. 3, describes the design of a platform mounted on a vehicle used for garden cleaning on hilly or mountainous terrain. The platform contains a track drive chassis, a leveling mechanism, a lifting mechanism, and a working platform. The leveling mechanism is mounted above the track drive chassis. The leveling mechanism comprises a front leveling frame, a rear leveling frame, a left leveling frame, and a right leveling frame. The leveling mechanism provides for arbitrary adjustment of platform position along X and Y axes.

The device closest to the claimed invention is capable of adjusting the position of its agricultural working platform by tilting it forward/backward and left/right as disclosed in patent KR 101911931, publication date 2018 Oct. 25. The design of the device makes it possible to lift the upper frame using first and second cylinders, as well as adjust the inclination of the lower frame in front/rear and left/right directions to compensate for terrain unevenness. At the bottom of the lower frame there is a subframe connected axially to an X-form bearing with both axes mutually perpendicular to the lower frame, which enables the lower frame to rotate along both axes of the X-form bearing. A block of four hydraulic cylinders is mounted on the lower frame and is used for tilting the frame in front/rear and left/right directions relative to the two axes of the X-form bearing.

SUMMARY OF THE INVENTION

The technical result achieved by the invention consists of enhancing the reliability of the design and providing a quick spacial stabilization of the platform.

The rotary support of the vehicle platform includes a platform mounting attachment in the form of a gimbal, whose flanges enable its attachment, respectively, to the vehicle support structure and to the lower surface of the platform; also located on said support structure are two platform position adjusters. Therein, each platform position adjuster includes an electric drive with a linear displacement unit based on screw-nut transmission and a carriage configured to move along a vertical guide and connected to the linear displacement unit with a pin joint. The support shelf of the carriage bears a push rod made in the form of struts ending with supports and having swivel joints between said supports and struts. Therein, the push rod supports are configured for mounting them on the support shelf of the carriage and on the platform, in this latter case eccentrically to the rotation axes of the gimbal.

The availability of the platform mounting gimbal that imparts the structure with strength and ease of all-round rotation, as well as the presence of two platform position adjusters located at platform impact points eccentrically to the gimbal rotation axes ensure the operational reliability of the rotary support. Each platform position adjuster consists of an electric drive, which drives the nut of the linear displacement unit along the screw, and a carriage capable of moving along the vertical guide. For this purpose, the carriage is connected to the linear displacement unit with a pin joint. Such connection of the carriage with the linear displacement unit makes it possible to transfer the power sufficient for moving the platform with load included, and allows for lax requirements in relation to parallelism between the screw in screw-nut transmission and the vertical guide for the carriage. This non-rigid design prevents possible damage to platform position adjusters caused by stress which may occur during rotary support operation. The screw-nut transmission and the electric motor operate in unloaded conditions and provide reliable and accurate spacial movement of the platform. The use of electric motors as main drivers provides a quick and accurate spacial stabilization of the platform, thus enhancing the reliability of the rotary support.

In particular, the electric drive includes an electric motor and a belt drive connecting the shaft of said electric motor with the nut of screw-nut transmission of the linear displacement unit.

Besides, the carriage contains at least one pin joint assembly including a sleeve with the pin fixed inside, while a bracket with at least one hole is rigidly attached to the linear displacement unit to permit the interaction of the bracket hole with the pin of the pin joint.

Moreover, inserts are installed between the carriage and said vertical guide.

DETAILED DESCRIPTION OF THE PREFERRED EMBODIMENTS

Embodiments of the Invention

Figure 1:
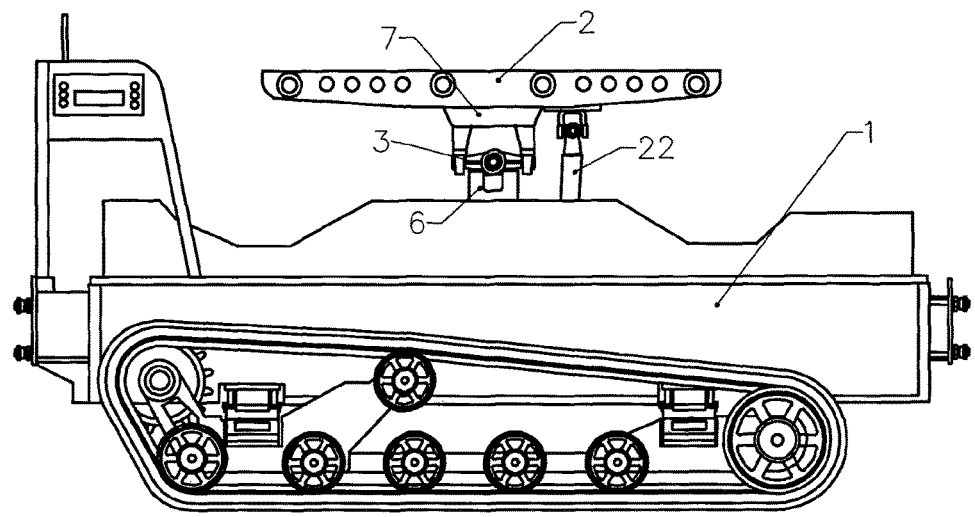
FIG. 1 shows a side view of the vehicle with a platform.
Figure 2:
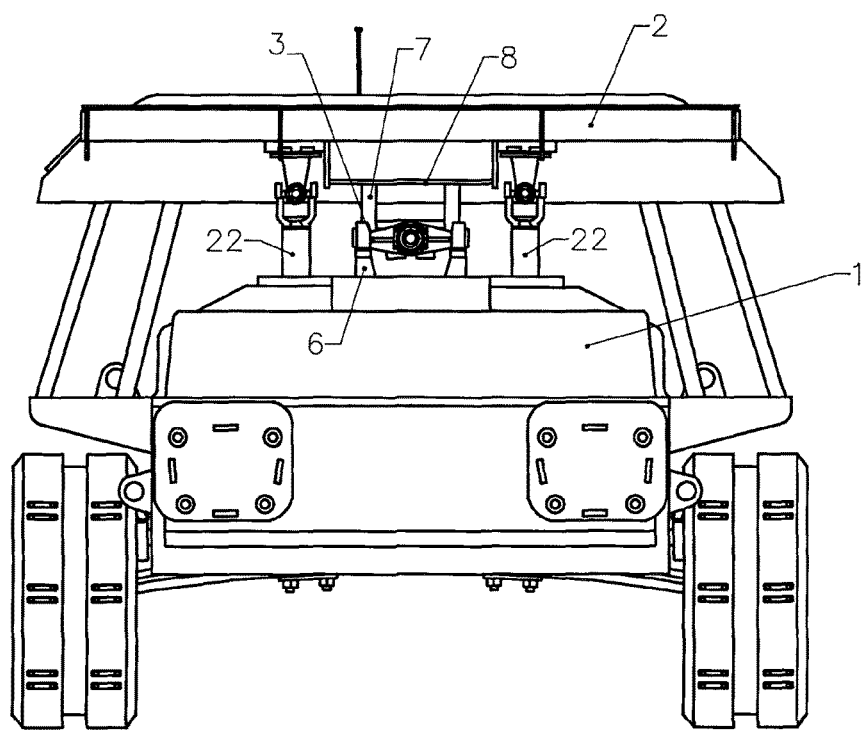
FIG. 2 shows a rear view of the vehicle with a platform.
Figure 3:
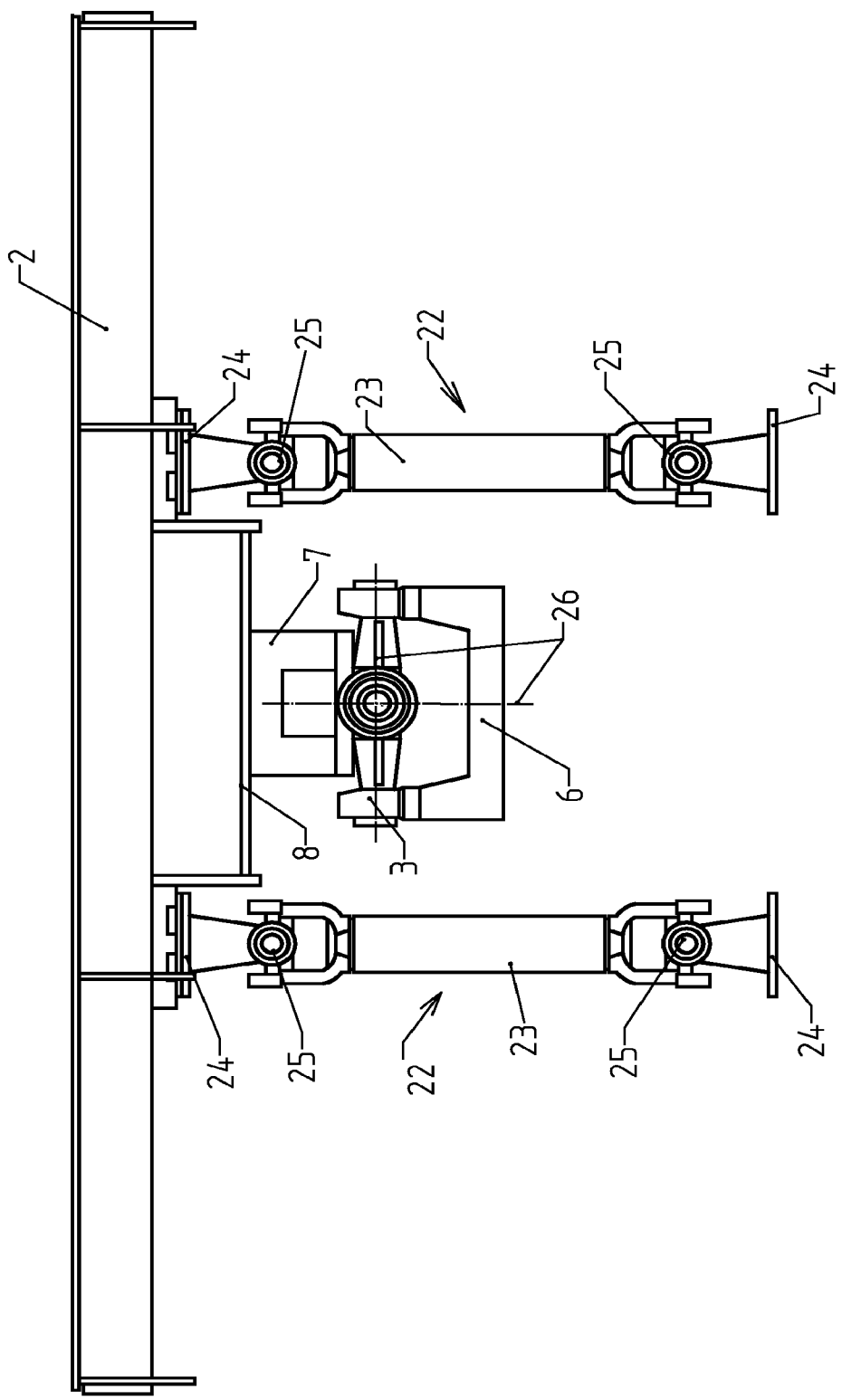
FIG. 3 shows the platform with a rotary support.
Figure 4:
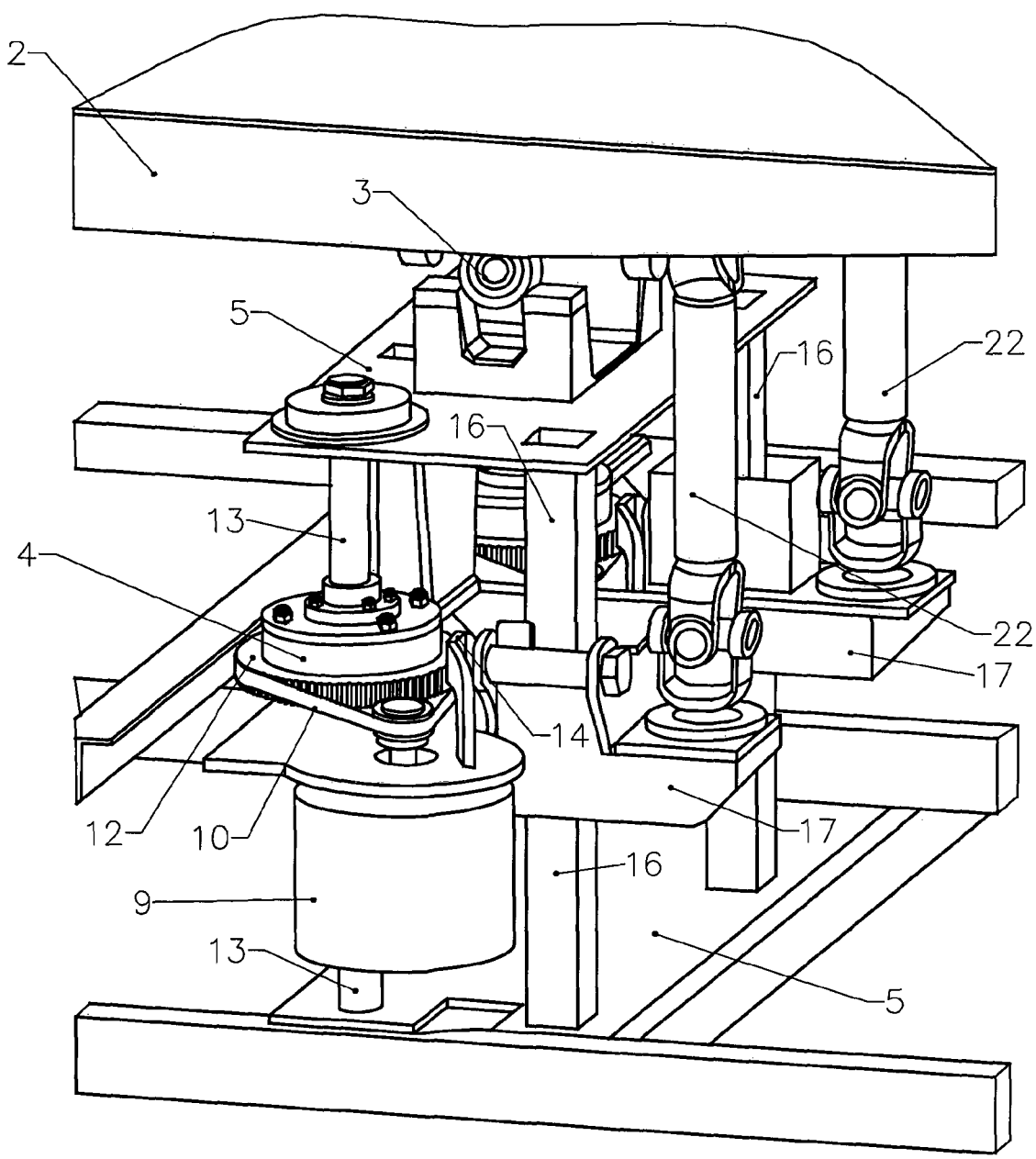
FIG. 4 shows an axonometric view of the rotary support.
Figure 9:
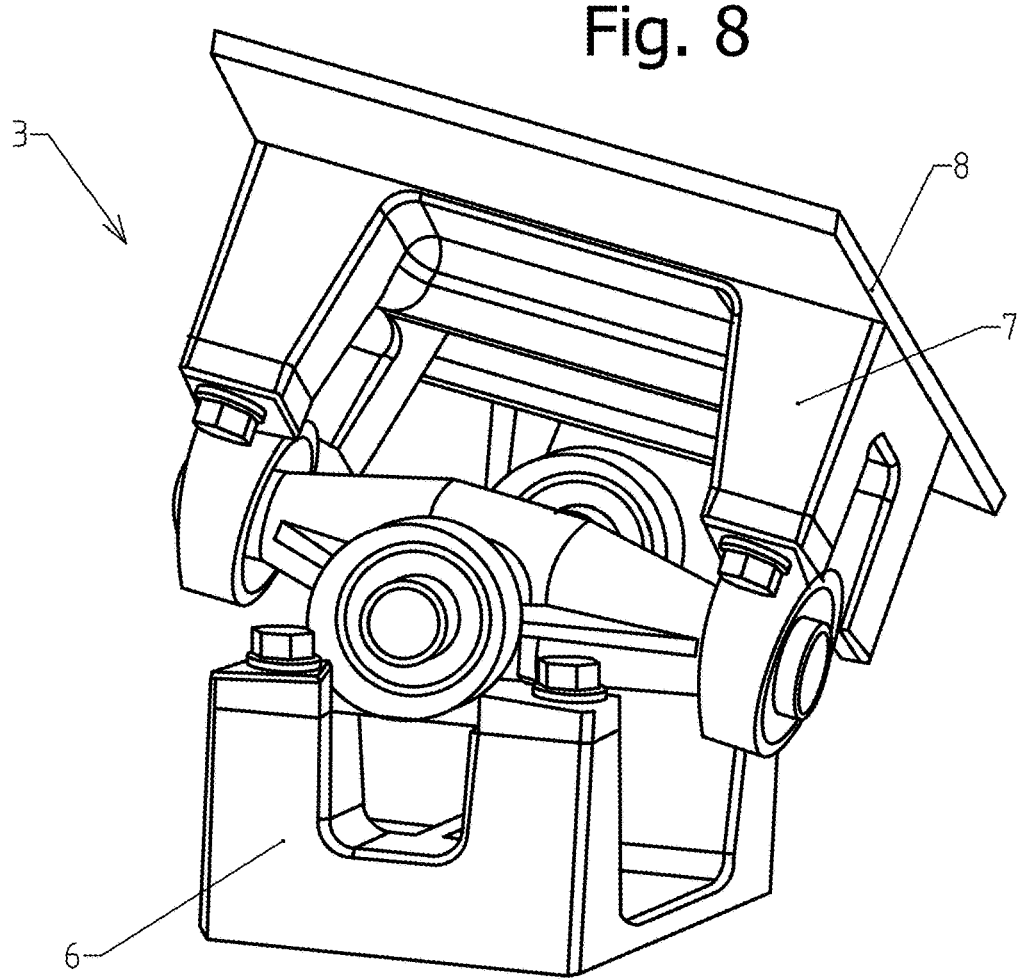
FIG. 9 shows the platform mount attachment in the form of gimbal.

Vehicle 1 (FIG. 1-FIG. 2) contains platform 2, which is oriented in space by means of the following parts of the rotary support (FIG. 3-FIG. 4): a platform mounting attachment in the form of gimbal 3 on support shelf 5 and two position adjusters 4 of platform 2 also resting on support shelf 5. Gimbal 3 (FIG. 9) includes flange 6 for attaching it to support shelf 5 of vehicle 1 and flange 7 for attaching to lower surface 8 of platform 2 (FIG. 3).

Each of the two position adjusters 4 of platform 2 (FIG. 4-FIG. 8) includes an electric drive with electric motor 9 and a linear displacement unit based on screw-nut transmission. Belt drive 10 couples shaft 11 of electric motor 9 with nut 12 of the screw-nut transmission. Screw 13 of the screw-nut transmission is rigidly fixed in the vertical plane on support shelf 5 of vehicle 1.

Figure 5:
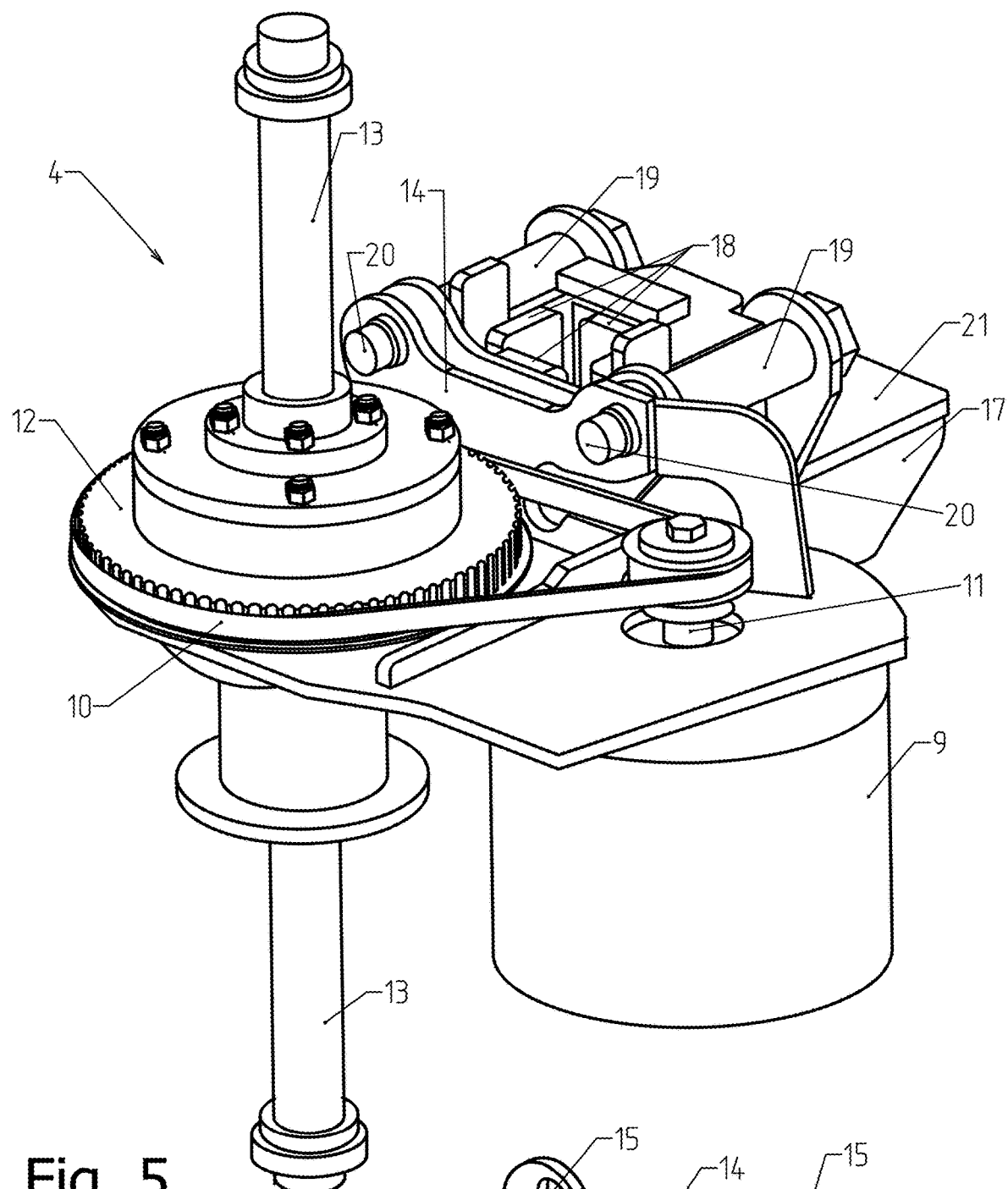
FIG. 5 shows an axonometric view of platform position adjuster.
Figure 6:
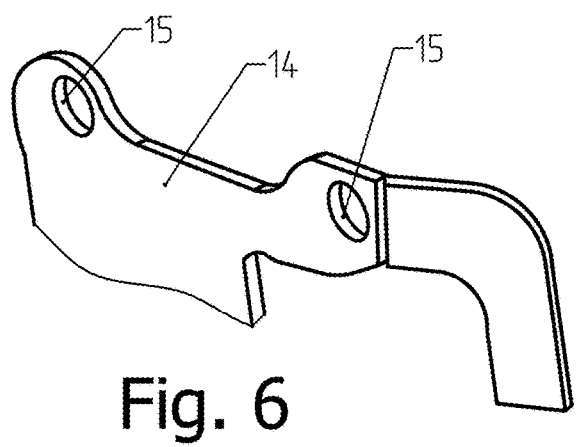
FIG. 6 shows a segment of the traction bracket of the pin joint.
Figure 7:
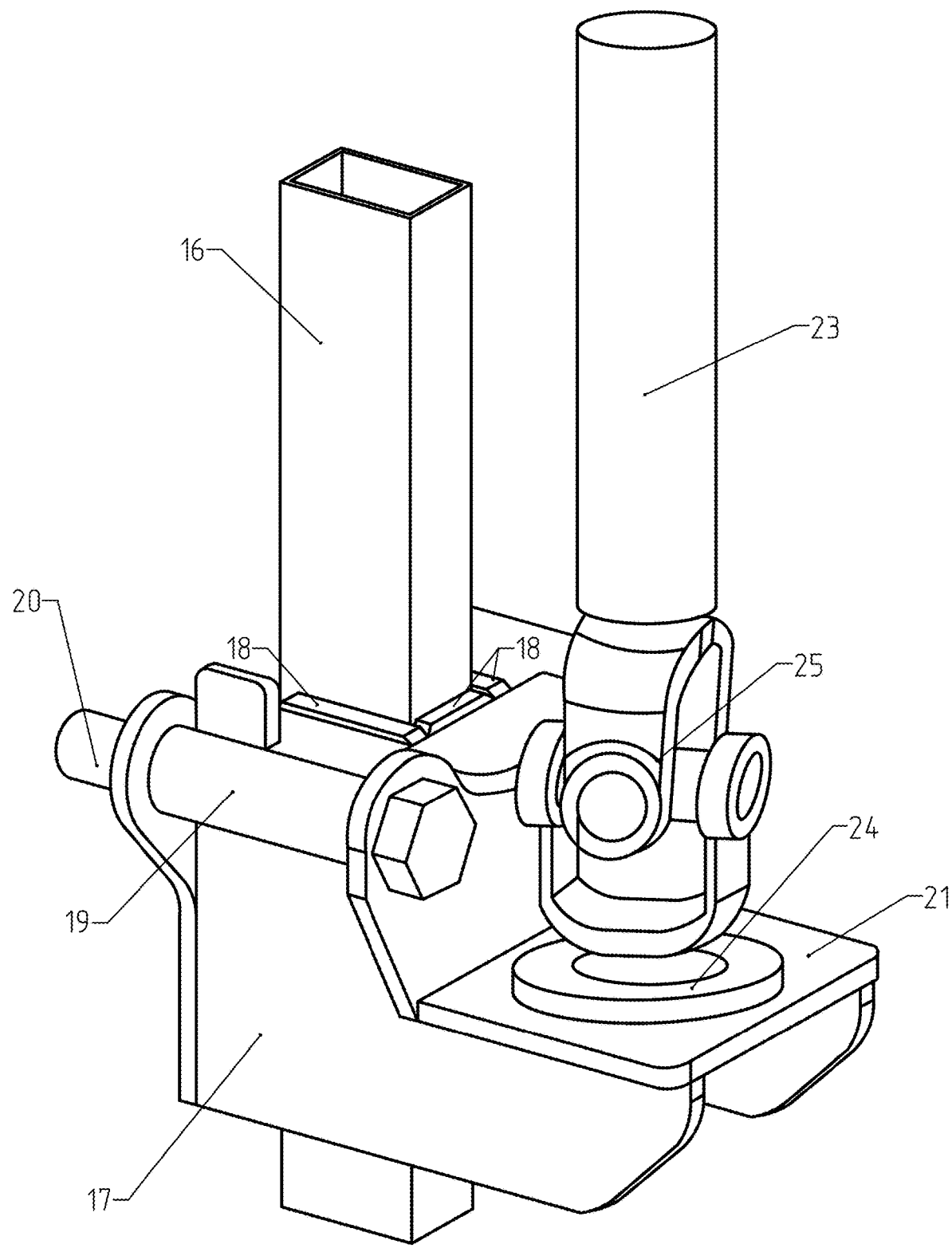
FIG. 7 shows an axonometric view of the carriage.
Figure 8:
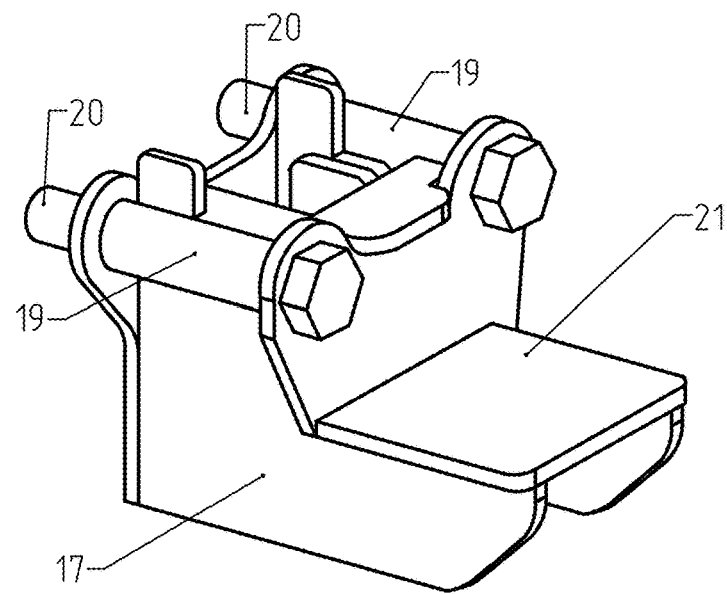
FIG. 8 shows the carriage.

The linear displacement unit has rigidly mounted bracket 14 with holes 15 serving as female holes for pin joint (FIG. 5 and FIG. 6).

Parallel to screw 13 of the linear displacement unit of each position adjuster 4 of platform 2 (FIG. 4) vertical guide 16 is mounted, which guides sliding carriage 17. Inserts 18 are fixed in the hole of carriage 17 between carriage walls and vertical guide 16 located in said hole. Inserts 18 are made of plastic material featuring a high slip coefficient, for example, polyamide. Carriage 17 bears the other part of the pin joint, which interacts with holes 15 of bracket 14 and includes sleeve 19 with pin 20 fixed inside. In this embodiment (FIG. 5), the pin joint includes two sleeves 19 with two pins 20 inserted into holes 15 of bracket 14.

Support shelf 21 of each carriage 17 bears push rods 22 made in the form of struts 23 with supports 24 at the ends of struts 23 and with swivel joints 25 between supports 24 and struts 23.

Electric motors 9 are controlled by a control system, whereas the spatial position of the platform can be determined by means of sensors, for example, a level sensor (not shown in the figures).

The rotary support of vehicle 1 operates as follows.

While operating or carrying loads, vehicle 1 can come across rough terrain, but platform 2 must remain in a horizontal position. When the platform position changes, the control system generates and feeds signals to electric motors 9, with horizon sensor readings taken into account. Thereupon, electric motors 9 are activated in time short enough to prevent platform 2 from obviously leaving the horizontal plane even if vehicle 1 travels at maximum speed. When any of electric motors 9 operating with each of two position adjusters 4 of platform 2 is activated, belt drive 10 turns nut 12, and the latter moves along screw 13. When nut 12 moves, it causes the movement of the linear displacement unit together with bracket 14. The pin joint assembly including two sleeves 19 and two pins 20 inserted into holes 15 of bracket 14 makes carriage 17 bearing push rod 22 and support shelf 21 move along guide 16.

Figure 10:
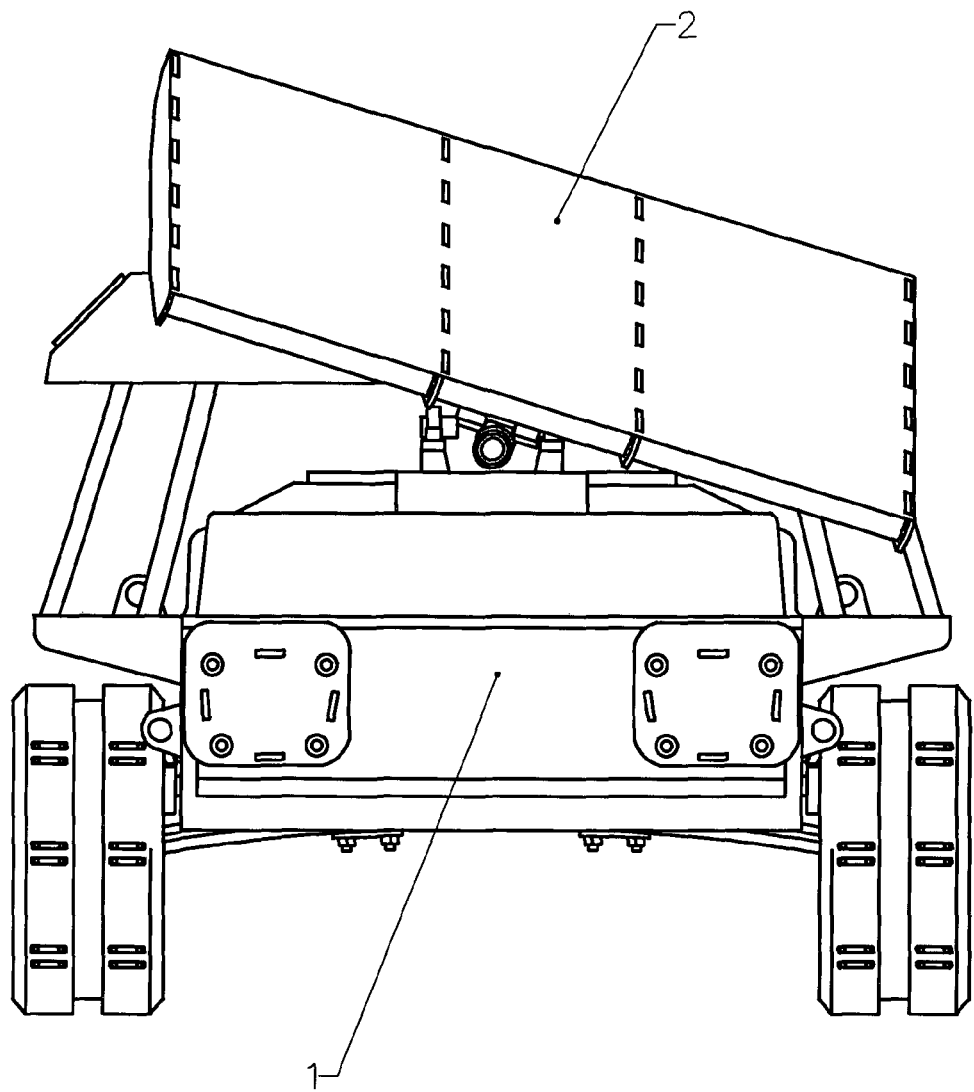
FIG. 10 shows a general view of the vehicle with a tilted platform.

Supports 24 of struts 23 of push rods 22 are mounted on platform 2 eccentrically to the rotation axes 26 of gimbal 3 (FIG. 3). As a result, platform 2 can turn in any direction using the gimbal in the center of platform 2 to keep a required position (FIG. 10).

The stability and operational capability of the rotary support as a whole is ensured by the separation of two power nodes. The platform mounting attachment represented by a gimbal enables the structure to carry the main weight of the platform with its load, and makes the turning of the platform to a required position possible. The availability of two platform position adjusters provides for a quick and accurate shift of the platform from one position to another.

Moreover, each of the platform position adjusters generates sufficient force for displacing and holding the loaded platform, whereas the gears used in said devices allow to reduce the load upon the most important nodes, while increasing the reliability of the structure, in particular when the movement of push rods and carriages is out of alignment.

INDUSTRIAL APPLICABILITY

The rotary support of the platform is designed primarily for agricultural vehicles. However, it can be used for other vehicles, which need a quick and reliable spatial stabilization of their nodes.

The invention claimed is:

1. A rotary support of a vehicle platform comprising:
a platform mounting attachment in a form of a gimbal having a first flange for mounting the gimbal on a vehicle support structure and a second flange for mounting the gimbal to a lower surface of the vehicle platform; and
two platform position adjusters located on the vehicle support structure, each platform position adjuster comprising an electric drive, a linear displacement unit with a screw-nut transmission, and a carriage configured to move along a vertical guide and connected to the linear displacement unit by a pin joint;
wherein a support shelf of the carriage bears at least one push rod made in a form of a strut, the strut having a support at each end of the strut and a swivel joint between the support and the strut at each end of the strut, the support being mounted on the support shelf and on the platform eccentrically to gimbal rotation axes.

2. The rotary support according to claim 1, wherein the electric drive comprises an electric motor and a belt drive coupling a shaft of the electric motor with a nut of the screw-nut transmission of the linear displacement unit.

3. The rotary support according to claim 1, wherein the carriage comprises at least one pin joint assembly comprising a sleeve with a pin fixed therein, and wherein the linear displacement unit has a bracket with at least one hole, the bracket being rigidly fixed on the linear displacement unit and enabling interaction of the at least one hole of the bracket with the pin of the pin joint.

4. The rotary support according to claim 1, wherein inserts are installed between the carriage and the vertical guide.

* * * * *